Oct. 23, 1962 C. G. BURTON 3,059,648
BEAN CLUSTER SEPARATOR
Filed May 26, 1959 2 Sheets-Sheet 1
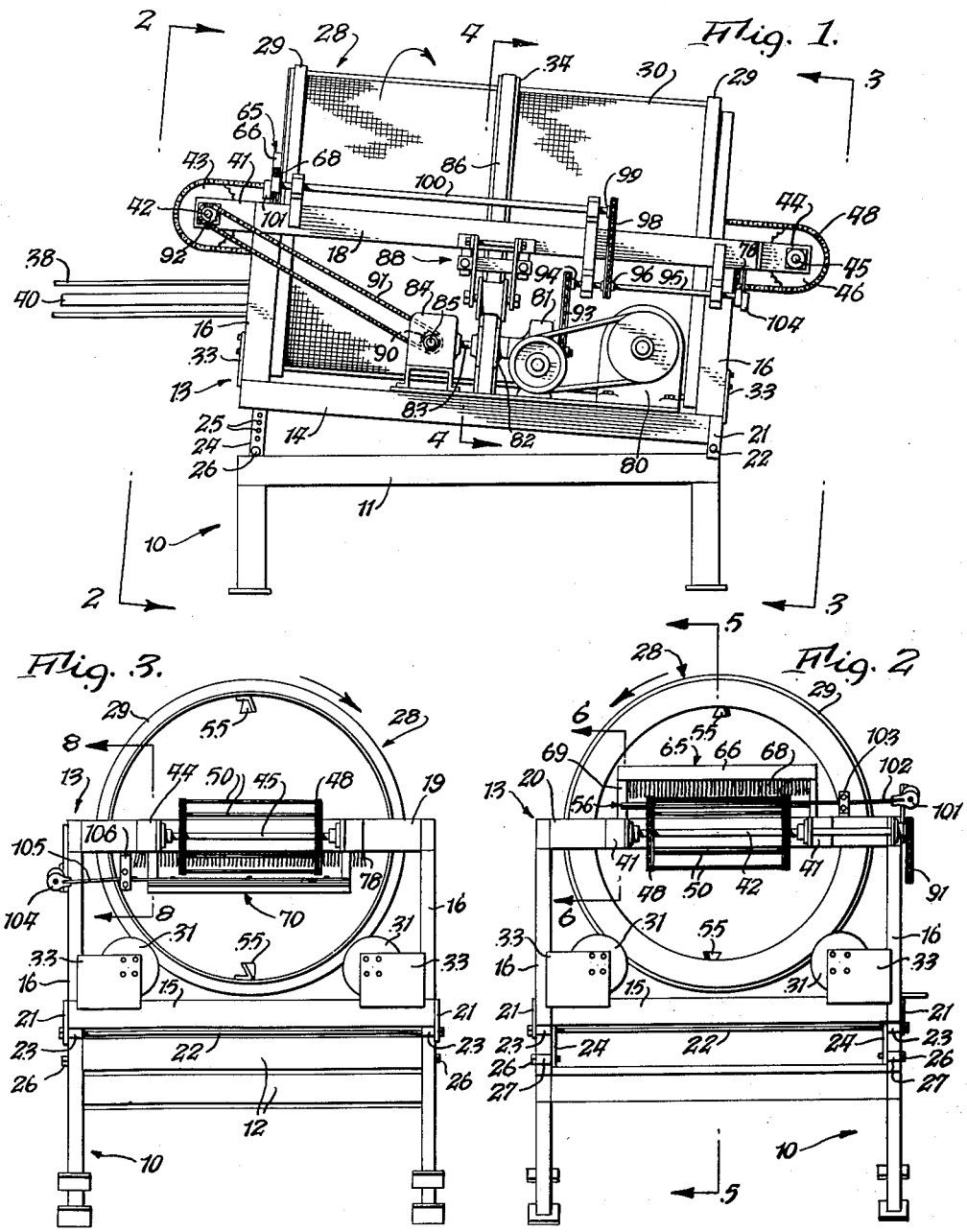
INVENTOR
Charles G. Burton
BY Popp and Sommer
ATTORNEYS

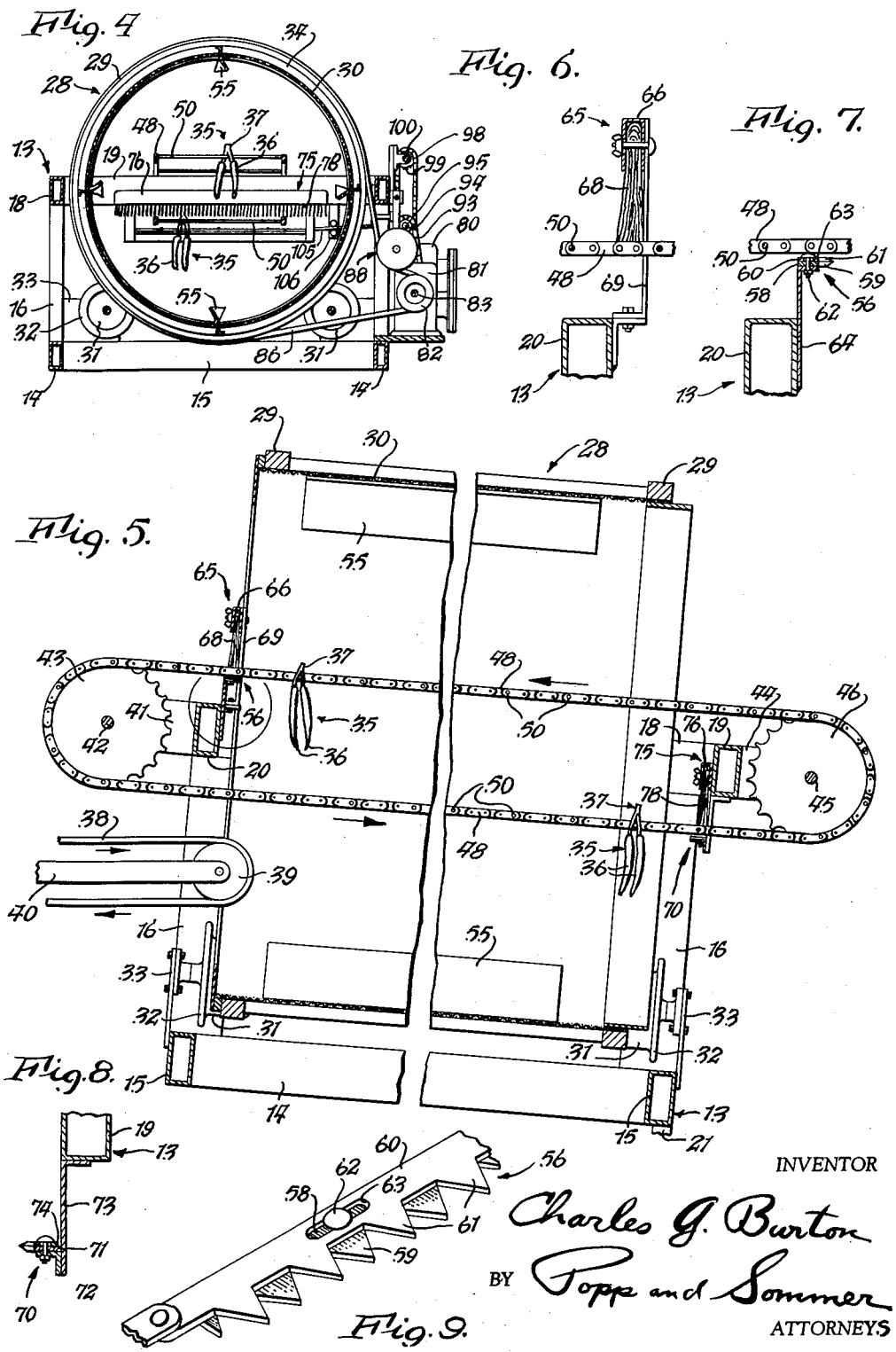

United States Patent Office 3,059,648
Patented Oct. 23, 1962

3,059,648
BEAN CLUSTER SEPARATOR
Charles G. Burton, Lewiston, N.Y., assignor to Chisholm-Ryder Company, Inc., Niagara Falls, N.Y., a corporation of New York
Filed May 26, 1959, Ser. No. 815,847
12 Claims. (Cl. 130—30)

This invention relates to a cluster breaker and more particularly to apparatus for separating clusters of string beans or the like from a stream of individual string beans containing such clusters and to a method and apparatus for cutting apart the furcated stems of such clusters.

In the commercial handling of string beans, the ends of each bean are cut off in a bean snipper. A conventional form of bean snipper consists of a hollow drum through which the beans are tumbled and having a multiplicity of tapering holes of outwardly diminishing form through which the ends of the beans find their way in being tumbled about within the drum. The periphery of the drum is traversed by a sharp blade which severs the projecting ends of the beans. The beans are tumbled around in the drum for a sufficient length of time to insure that the opposite ends of all the beans are substantially completely snipped, there being no loss of the body part of a snipped bean because of the outwardly diminishing form of the holes.

In picking beans, mechanically or by hand, by far the greater part of the beans are picked as individual string beans and no problem is encountered as to the snipping of such individual beans as above described. However a certain number of beans are picked in the form of clusters with two or more individual string beans being connected together by a common furcated stem. Such clusters of beans can only have the free ends of the beans snipped, on going through a bean snipper since the connecting stem at the joined ends of the beans prevents these joined ends of the beans from passing through the openings in the bean snipper and being cut.

It is therefore an object of the invention to provide apparatus for efficiently separating clusters of string beans or the like from a mass or stream of individual beans containing such clusters.

It is another object of the present invention to provide apparatus for severing such clusters into individual beans in such manner that the string beans on passing through a conventional bean snipper will be properly snipped at both ends.

Another object of the invention is to provide such a cluster separator and cutter which is positive in its action, the clusters being positively propelled into engagement with severing devices against which they are positively held while being cut.

Another object of the invention is to provide such a cluster separator and cutter which is adapted to be placed in line with other apparatus, the output from the cluster separator and cutter being adapted to be discharged directly into a bean snipper.

Another object of the invention is to provide such a cluster separator, preferably combined with a cutter for cutting the clusters into individual beans, which has high capacity and at the same time insures substantially complete severing of all clusters of beans contained therewithin.

Another object of the invention is to provide such a cluster separator, preferably combined with a cutter for cutting the clusters into individual beans, which is adjustable in its action, particularly as to the rate of flow of the material passing therethrough so that this rate can be adjusted to different types of beans.

Another object of the invention is to provide such a cluster separator, preferably combined with a cutter for cutting the clusters into individual beans, having relatively broad cluster collecting means.

Another object is to provide such a cluster separator, preferably combined with a cutter for cutting the clusters into individual beans, which also acts to clean the string beans and free them from mud and the like without, however, bruising or injuring the beans.

Another object is to provide such a cluster separator, preferably combined with a cutter for cutting the clusters into individual beans, which is very compact, considering the quantity of string beans handled, and which is relatively low in cost and free from the necessity of close supervision or service difficulties.

Other objects and advantages of the invention will be apparent from the description and drawings in which:

FIG. 1 is a side elevational view of a machine embodying the present invention and which separates clusters of beans from a stream of individual beans and also cuts the clusters up into individual beans.

FIG. 2 is an end elevational view thereof viewed from line 2–2, FIG. 1.

FIG. 3 is an opposite and elevational view thereof viewed from the line 3–3, FIG. 1.

FIG. 4 is a vertical transverse section taken generally on line 4—4, FIG. 1.

FIG. 5 is an enlarged fragmentary vertical sectional view taken generally on line 5–5, FIG. 2.

FIG. 6 is an enlarged fragmentary vertical sectional view taken generally on line 6–6, FIG. 2, and illustrating a cluster hold down device mounted on the elevated end of the cluster separator and cutter of FIG 1.

FIG. 7 is an enlargement of part of the circled portion of FIG. 5 and illustrating the knife or severing device associated with the hold down device of FIG. 6.

FIG. 8 is an enlarged fragmentary vertical sectional view taken generally on line 8–8 of FIG. 3 and illustrating the knife or severing device mounted on the lower end of the cluster separator and cutter of FIG. 1.

FIG. 9 is an enlarged partial perspective view of the cutting blades used in the knife or severing device of FIG. 7.

The cluster separator and cutter of the present invention, as shown in FIG. 1, is adjustably mounted on a sub frame or bed indicated generally at 10 and comprising a rectangular frame composed of longitudinal beams 11, connected by end beams 12. The cluster breaker includes a frame, indicated generally at 13, adjustably mounted on this subframe or bed 10, this frame comprising longitudinal bottom bars 14 connected by transverse end bars 15 and this frame also including corner posts 16 connected at their upper ends by upper longitudinal frame bars 18 and upper transverse end bars 19 and 20. As shown in FIG 3, one of the lower transverse end bars 15 of the frame is pivotally connected to the corresponding transverse beam of the sub frame at each of two corresponding end corners of the frame 13 by a pair of depending ears 21 which embrace the corresponding end of the subframe or base 10 and are connected thereto by a horizontal transverse pivot rod 22 passing through open ended sleeves 23 welded to the top of the sub frame. The opposite elevated end of the frame 13, as illustrated in FIG. 2 is provided with a pair of rigid plates 24 projecting downwardly therefrom and each having a vertical series of holes 25. A supporting pin 26 is adapted to be removably inserted in any selected hole 25 in either of these depending plates 24 to support the adjacent end of the frame 13 at a corresponding inclined elevation. For this purpose each of the pins 26 can be contained within an open ended sleeve 27 welded to the top of the sub frame or bed 10.

The numeral 28 represents a substantially cylindrical and open ended, foraminous drum composed of end rings 29 and a cylindrical screen 30 contained within and joining these end rings. Each end ring is rotatably supported by a pair of rollers 31, these rollers preferably having end flanges 32 for supporting the drum 28 against axial displacement, especially when adjusted to the annular inclined position shown, and the rollers 31 are suitably journalled in corner plates 33 welded to the lower transverse beams 15 and corner posts 16 at the four corners of the frame 13. The drum 28 also preferably includes an external center ring 34 which serves as a pulley for a belt drive as hereinafter described.

The numeral 35 represents a cluster of string beans comprising the individual beans 36 connected together by a furcated stem 37. A quantity of picked beans, including such clusters 35, are fed into the open elevated inlet end of the cylinder 28. This can be done in any conventional manner as by the endless feeder conveyer belt 38 the discharge end of which is shown as suitably supported by a roller 39 suitably journalled in a cantilever arm 40, and this feed belt is driven so that its upper stretch moves into the cylinder 28 and discharges the beans into the cylinder at its elevated end.

A pair of rigid arms 41 are suitably secured to the transverse beam 20 to project outwardly therefrom in a generally horizontal direction and on these arms is journalled a shaft 42 to which are fixed a pair of axially spaced sprocket wheels 43, the shaft 42 extending horizontally and transversely of the drum 28 and being arranged exteriorly thereof. Similarly a pair of arms 44 are fixed to and project outwardly from the upper cross beam 19 of the frame 13 and journal a horizontal transverse shaft 45 to which are fixed a pair of axially spaced sprockets 46 in line with the sprockets 43. Each corresponding pair of sprockets 43, 46 carries an endless chain 48, these chains meshing with the teeth of the sprockets and passing longitudinally through the drum 28. Certain of the links of the chains 48 are connected by cross bars 50, these cross bars being arranged at regular intervals along the chains and being spaced a sufficient distance to permit individual string beans to fall therethrough but serving to catch, by the crotch of the connecting furcated stems 37, clusters of beans dropping bean first, from above the two flights of cross bars. Certain of these clusters are caught by the cross rods traversing the upper stretch of the chains 38 and certain of these clusters are caught by the cross bars of the lower stretch of these chains, and to this end it will be noted that the cross bars 50 of the upper stretch move in the opposite direction from the cross bars of the lower stretch so as to facilitate this action of both stretches in catching clusters.

For the purpose of lifting the string beans to fall freely upon the moving cross bars 50, the drum 28 is provided with a plurality of lifting vanes indicated generally at 55 which elevate batches of beans contained within the drum and drop each batch off to fall upon the upper flight of cross bars 50. These vanes can be of any suitable form but preferably extend longitudinally substantially the full length of the drum 28 and have their opposite ends arranged in different angular relations with reference to the radius of the drum. Thus it will be seen that each vane is of twisted form, to extend at one end at an acute angle to a drum radius intersecting the base of the vane at its juncture with the drum, and at its other end at an opposite acute angle with reference to the same radius. The purpose of this differential in angularity or twisted form of the vane is to distribute the batch of the beans uniformly the full width of the upper flight of the cross bars 50, the beans at the feed end of the lifting vane, which is preferably curved away from the direction of drum rotation (FIG. 2), tending to drop off first onto the corresponding or near side (right side, FIG. 2) of the upper or lower flight of cross bars 50 and the beans at the opposite or discharge end of this vane, which is preferably curved toward the direction of drum rotation (FIG. 3), being retained thereon for a longer length of time and being dropped off on the far side (right side, FIG. 3) of the upper or lower flight of cross bars 50. By reason of the inclined arrangement of the drum 28, the string beans are evenly distributed or processed progressively from the upper or elevated inlet end to the lower or outlet end of the drum at a rate determined by the angularity of the drum. The string beans are lifted a number of times by the vanes 55 and deposited upon the flights of cross bars 50 so that while a cluster of beans may not be caught by its crotch on the cross bar 50 the first time it is elevated, substantially all of the clusters will be so caught before the beans are discharged from the lower end of the drum.

As illustrated in FIG. 5, the chains 48 are driven so that the upper flight of cross bars 50 moves upwardly and the lower flight of these cross bars move downwardly by a drive mechanism as hereinafter described. The clusters 35 caught by the upper stretch of cross bars are brought against a knife or severing device indicated generally at 56 and having its blades preferably arranged at the elevated end of the drum 28 so that when the beans are severed from their stem 37 they drop into the inlet end of the drum and hence rejoin the group of beans in process. Each knife or severing device preferably comprises a stationary blade 58 (FIGS. 7 and 9) formed to provide a series of sharp-edged teeth 59 which face the interior of the drum and the approaching clusters of beans therein. A movable blade 60 is arranged in contact with the stationary blade and provided with similar sharp-edge saw teeth 61 facing the approaching beans and acting in conjunction with the teeth 59 to sever the furcated stems 37 substantially below their crotch. Suitable means, such as the pins 62 and slots 63 can be provided for guiding the movable blade 60 for longitudinal movement relative to the fixed blade 58 and this movable blade is driven by a mechanism as hereinafter described. This stationary blade 58 can be supported in any suitable manner, and for this purpose the frame 13 is shown as provided with an angle 64 projecting upwardly from its upper cross beam 20 and on which the stationary blade 58 is suitably mounted.

An important feature of the invention resides in the provision of means holding the bean clusters 35 on the upper flight of cross bars 50 down while being acted upon by the cutting means 56. Such means can be in the form of a simple brush 65 shown in FIG. 6. This brush can consist of a bar 66 from which bristles 68 project downwardly into close proximity with the upper flight of cross bars 50 over the severing device 56 and the ends of the back or top 66 of the brush can be supported by uprights 69 suitably fixed to and projecting upwardly from the upper cross bar 20 of the frame 13.

A substantially similar cutting and hold down mechanism is provided at the lower end of the lower flight of cross bars 50 for severing the beans from the stems 37 caught on these lower cross bars and holding these stems down while the beans are severed therefrom. Thus, as shown in FIGS. 5 and 8, the numeral 70 represents such a severing device which consists of a stationary blade 71 similar to the blade 59 and mounted by means of a cross bar or angle 72 and a vertical bar or angle 73 depending downwardly from the upper cross bar 19 of the frame. On this stationary blade 71 is mounted a movable blade 74 of the same form as the blade 61 and similarly connected to the stationary blade for longitudinally reciprocating movement relative thereto. Both blades 71, 73 can be provided with teeth to engage and sever the furcated stems of clusters of beans suspended on the cross bars 50 on the lower flight. A brush 75 having a back 76 is shown in FIG. 5 being as secured directly to the cross beam 19 of the frame 13 and as having bristles 78 projecting downwardly into close proximity with the lower flight of cross bars 50 so as to engage the stems of the bean clusters 55 being severed by the cutting device 70. Both hold down brush 75 and the blades of severing device 70 are located externally of the outlet end of drum 28 to facilitate discharge of the severed beans by permitting the same to drop out of the drum.

The various moving parts of the apparatus as above described can be driven in any suitable manner and preferably by means mounted on frame 13. Thus, as best seen in FIGS. 1 and 4, numeral 80 represents a motor which, through a speed reducer 81 drives a pulley 82 on a shaft 83, this shaft, through gears (not shown) contained within a gear box 84 also driving a cross shaft 85. The pulley 82 drives a belt 86 which passes around the center ring or pulley 34 of the drum 28, a suitable belt tightener indicated generally at 88 also being provided. The shaft 85, through a pulley 90 drives a chain 91 which in turn drives a sprocket 92 fast to the corresponding end of the shaft 42. A chain 93 which is driven from the gear reducer 81 drives a sprocket 94 fast to an end of a longitudinal shaft 95. A sprocket 96 on the shaft 95 through a chain 98 drives a sprocket 99 fast to another longitudinal shaft 100. The shafts 95 and 100 are suitably journalled on one side of the frame 13 and the shaft 100 carries an eccentric 101 connected by a rod or pitman 102 with the movable cutting blade 60 at the inlet end of the machine, the pitman passing through a suitable roller guide 103. Similarly, the shaft 95 carries an eccentric 104 which actuates the movable blade 74 by means of a pitman 105 passing through a roller guide 106 at the outlet end of the machine.

The feed belt 38 can deliver a continuous supply of string beans into the elevated end of the drum 28. These beans are for the most part individual beans but a substantial number of such beans can be connected in clusters 35 and it is the purpose of the machine to break these clusters 35 into individual beans for bean snipping and other operations. The beans falling into the drum 28 are tumbled around therein and are lifted in batches toward the top of the drum and then dropped. In so being tumbled around and lifted and dropped, the beans are freed from mud and the like, this mud and other debris falling through the screening 30 of the cylinder.

In lifting each batch of beans, each vane 55, by virtue of its twist or the differential in angularity at the opposite ends thereof drops this batch off first at one end of the vane and then progressively toward the opposite end thereof. Accordingly, each batch of beans lifted by each vane 55 is evenly distributed the full width of the upper flight of cross bars 50. This upper flight of cross bars is moving upwardly toward the inlet end of the cylinder and a certain number of the clusters 35 will be caught, by the crotch, on these cross bars and carried toward the inlet end of the cylinder. The stems 37 of these clusters are brought into contact with the relatively reciprocating saw blades 58 and 60 the sharpened teeth of which so act to saw off those portions of the stems 37 depending from the cross bars 50. Accordingly, the cluster of beans is separated into the individual beans which fall down into the cylinder 28 and the stems which can continue on with the cross bars 50 or which may be swept from these cross bars by the brush 65. The bristles 68 of this brush engage the stems 37 of the bean clusters while being cut by the blades 58 and 60 so as to hold the cluster against displacement while the beans are being severed therefrom.

The lower flight of cross bars 50 are moving in the opposite direction and serve to catch clusters which fall between the cross bars 50 of the upper stretch. These clusters are caught by their crotches in the same manner as with the cross bars in the upper flight. These clusters are passed through the zone of action of the lower blades 71 and 74 since these blades are arranged below the lower flight of cross bars 50. While being so severed the bristles 78 hold the clusters against displacement and the beans 36 so severed by the blades 71 and 74 fall into the stream of beans emerging from the lower outlet end of the cylinder.

The rate of flow of the beans through the device can be regulated by removing the supporting pins 26 and adjusting the inlet end of the frame 13 vertically, following which the pins 26 can be replaced in the corresponding holes 25.

From the foregoing it will be seen that the present invention provides a high capacity cluster separator and method of cutting clusters which acts positively upon the clusters to sever the beans therefrom with a minimum of injury to the beans and at the same time acts to tumble the string beans and remove dirt therefrom.

What is claimed is:

1. A machine for separating and cutting clusters of beans or the like having furcated stems, said machine comprising inclined container means having an outlet end, an elevated inlet end and being rotatable for lifting and distributing the clusters fed thereto, collector means movable freely through said container means for catching the clusters by the crotches of their furcated stems as the clusters fall bean first within said container means and for feeding the caught clusters toward both ends of said container means, means arranged adjacent both ends of said container means beneath said collector means and being reciprocable for severing the individual beans from their furcated stems, means arranged adjacent said both ends of said container means above said collector means for holding the furcated stems down against said severing means, and power operated means for rotating said container means, moving said collector means and reciprocating said severing means.

2. A machine as in claim 1, said container means comprising a substantially cylindrical, open-ended drum having an outlet end and an elevated inlet end for distributing the clusters fed into said inlet end longitudinally of said drum toward said outlet end, said drum being rotatable about its axis and having a plurality of circumferentially spaced vanes extending longitudinally of and depending inwardly from its inner periphery for lifting and distributing the clusters laterally therein.

3. A machine as in claim 1, said collector means comprising rotatable sprocket means arranged externally of both ends of said container means, endless chain means meshing with said sprocket means and being movable freely through said container means, and a plurality of bar means connected to said chain means at intervals therealong and thereby forming a flight movable toward one end of said container means and a flight movable toward the other end thereof, the bar means in said flights catching the clusters by the crotches of their furcated stems as the clusters fall bean first within said container means and feeding the caught clusters toward both ends of said container means as the latter rotates and the flights move in opposite directions.

4. A machine as in claim 1, said severing means comprising knife mechanisms arranged adjacent said inlet and outlet ends of said container means and including relatively reciprocable blades extending laterally of the corresponding ends of said container means beneath said collector means and facing inwardly toward the interior of said container means for severing the individual beans from their furcated stems.

5. A machine as in claim 1, said hold-down means comprising brushes arranged adjacent said inlet and outlet ends of said container means and extending laterally of the corresponding ends of said container means above said collector means and projecting downwardly toward said collector means for holding the clusters down against said severing means.

6. A machine for separating clusters of beans or the like connected by furcated stems from a stream of individual beans containing such clusters, comprising a support, a tubular open ended generally horizontally drum mounted on said support to rotate about its axis, means feeding said stream into one end of said drum for distribution lengthwise thereof, a plurality of circumferentially spaced vanes extending longitudinally of and projecting inwardly from the inner periphery of said drum for lifting said stream and dropping it as a free falling stream at the center of the drum, a pair of upright sprocket wheels rotatably mounted on said frame externally of both ends of drum, a pair of endless chains meshing with said sprocket wheels and being movable freely through said drum, and a plurality of cross bars connecting said chains at regular intervals therealong and thereby forming an upper flight movable toward one end of said drum and a lower flight movable toward the other end thereof, the twisted vanes in said drum dropping and evenly distributing the clusters laterally over said flights, and the cross bars in said flights catching the clusters by the crotches of their furcated stems as the clusters fall bean first from said vanes within said drum and feeding the caught clusters toward both ends of said drum as the latter rotates and said flights move in opposite directions.

7. A machine as in claim 6 including an inlet knife mechanism and an outlet knife mechanism mounted on said frame adjacent said inlet and outlet ends respectively of said drum, each of said knife mechanisms including relatively reciprocable sawtooth blades extending laterally of the corresponding end of said drum beneath the corresponding flight of said chains and cross bars and having their teeth facing inwardly toward the interior of said drum for severing the individual beans from their furcated stems, the blades of said inlet knife mechanism being located substantially at said inlet end of said drum so that the individual beans severed thereby will fall back into said drum and be distributed toward said outlet end thereof, and the blades of said outlet knife mechanism being located externally of said outlet end of said container so that the individual beans severed thereby will fall out of said drum.

8. A machine as in claim 7 including an inlet brush and an outlet brush mounted on said frame adjacent said inlet and outlet ends respectively of said drum, each of said brushes extending laterally of the corresponding end of said drum above the corresponding flight of said chains and cross bars and having its bristles projecting downwardly into close proximity with the corresponding flight of said chains and cross bars for holding the clusters down against the corresponding knife mechanism.

9. A machine as in claim 8 including power-operated means mounted on said frame for rotating said drum and sprocket wheels and reciprocating said blades.

10. A machine for separating clusters of beans or the like connected by furcated stems from a stream of individual string beans containing such clusters and thereafter cutting up said clusters, comprising means releasing said stream to drop as a free falling stream, said releasing means being in the form of an inclined container having an outlet end and an elevated inlet end and being rotatable for lifting said stream of individual beans containing said clusters from the bottom of the container and releasing them from the upper part of the rising side of said container, a conveyer having a portion movable lengthwise in said container in a horizontal direction across said free falling stream including a succession of generally horizontal bar-like members spaced to permit the individual string beans to fall therethrough and catching said clusters by the crotches of their furcated stems, a cutting blade movably mounted in closely spaced relation below the downstream end of said portion of said conveyer to cut said stems below their crotches caught upon said bar-like members, and sever the individual beans hanging therefrom, and means actuating said cutting blade.

11. A machine for separating clusters of beans or the like connected by furcated stems from a stream of individual string beans containing such clusters and thereafter cutting up said clusters, comprising means releasing said stream to drop as a free falling stream, said releasing means being in the form of an open ended drum rotating about a horizontal axis, said drum including a plurality of circumferentially spaced vanes for lifting said stream of individual beans containing such clusters from the bottom of the drum and releasing them from the upper part of the rising side of said drum, a conveyer having a portion movable lengthwise in said container in a horizontal direction across said free falling stream including a succession of generally horizontal bar-like members spaced to permit the individual string beans to fall therethrough and catching said clusters by the crotches of their furcated stems, a cutting blade movably mounted in closely spaced relation below the downstream end of said portion of said conveyer to cut said stems below their crotches caught upon said bar-like members, and sever the individual beans hanging therefrom, and means actuating said cutting blade.

12. A machine for separating clusters of beans or the like connected by furcated stems from a free falling stream of individual beans containing said clusters, comprising an endless conveyer journalled on transversely spaced generally horizontal axes and having generally horizontal flights movable across said free falling stream and arranged in vertically spaced relation one above the other, an open-ended drum surrounding said endless conveyer and rotating about an axis extending lengthwise of the movement of the flights of said conveyer, circumferentially spaced vanes extending longitudinally of and projecting inwardly from the inner periphery of said drum for lifting said stream to a position above said conveyer flights, said vanes being twisted longitudinally so that they are curved away from the direction of drum rotation adjacent one end of said drum and toward said direction adjacent the other end thereof for distributing said clusters laterally across said flights, each of said flights including a succession of generally horizontal bar-like members spaced to permit the individual string beans to fall therethrough and being sufficiently thin to catch said clusters by the crotches of their furcated stems, and means arranged at the downstream end of each stretch and removing the caught clusters from said rods.

References Cited in the file of this patent

UNITED STATES PATENTS

| | | |
|---|---|---|
| 801,141 | Erickson | Oct. 3, 1905 |
| 1,059,129 | Edwards et al. | Apr. 15, 1913 |
| 1,415,896 | Plummer | May 16, 1922 |
| 1,566,231 | Schlaegel | Dec. 15, 1925 |
| 1,800,622 | Granberg | Apr. 14, 1931 |
| 2,129,452 | Van Sickle | Sept. 6, 1938 |
| 2,608,973 | Coons | Sept. 2, 1952 |
| 2,825,455 | Streich et al. | Mar. 4, 1958 |